US012609593B2

(12) United States Patent
Arbesmeier

(10) Patent No.: US 12,609,593 B2
(45) Date of Patent: Apr. 21, 2026

(54) ELECTRIC MACHINE WITH DISCONNECTABLE BRUSH MODULE, THE BRUSH MODULE, AND A MOTOR VEHICLE

(71) Applicant: AUDI AG, Ingolstadt (DE)

(72) Inventor: Martin Arbesmeier, Altmannstein (DE)

(73) Assignee: AUDI AG, Ingolstadt (DE)

( * ) Notice: Subject to any disclaimer, the term of this patent is extended or adjusted under 35 U.S.C. 154(b) by 354 days.

(21) Appl. No.: 18/351,411

(22) Filed: Jul. 12, 2023

(65) Prior Publication Data

US 2024/0022144 A1 Jan. 18, 2024

(30) Foreign Application Priority Data

Jul. 13, 2022 (DE) ..................... 10 2022 117 413.1

(51) Int. Cl.
*H02K 13/00* (2006.01)
*H02K 13/02* (2006.01)

(52) U.S. Cl.
CPC ........... *H02K 13/006* (2013.01); *H02K 13/02* (2013.01); *H02K 2213/12* (2013.01)

(58) Field of Classification Search
CPC ... H02K 13/006; H02K 13/02; H02K 2213/12
See application file for complete search history.

(56) References Cited

U.S. PATENT DOCUMENTS

| | | | |
|---|---|---|---|
| 2,625,247 A | * | 1/1953 | Shurts ..................... F16D 47/06 |
| | | | 192/3.21 |
| 2,777,550 A | * | 1/1957 | Forster .................... F16D 27/02 |
| | | | 192/3.56 |
| 3,823,357 A | | 7/1974 | Sapper |
| 4,209,213 A | * | 6/1980 | Wussow ............... H01R 39/00 |
| | | | 310/239 |
| 4,676,117 A | * | 6/1987 | Schiel ........................ F16H 1/08 |
| | | | 74/432 |
| 5,816,378 A | * | 10/1998 | Kobayashi .............. F16D 11/14 |
| | | | 192/108 |
| 2014/0191599 A1 | | 7/2014 | Joung et al. |
| 2017/0117779 A1 | | 4/2017 | Haldemann |

FOREIGN PATENT DOCUMENTS

| | | |
|---|---|---|
| CN | 111987868 A | 11/2020 |
| DE | 102015207950 A1 | 11/2016 |
| EP | 3159980 A1 | 4/2017 |

* cited by examiner

*Primary Examiner* — Tulsidas C Patel
*Assistant Examiner* — Mohammed Ahmed Qureshi
(74) *Attorney, Agent, or Firm* — Seed Intellectual Property Law Group LLP

(57) ABSTRACT

An electric machine comprising a rotor having a rotor shaft and a brush module having a brush holder with at least one brush for energizing the rotor, wherein the brush module comprises a shaft journal which can be coupled reversibly mechanically to the rotor shaft of the electric machine and against which the brush lies.

25 Claims, 5 Drawing Sheets

ELECTRIC MACHINE WITH DISCONNECTABLE BRUSH MODULE, THE BRUSH MODULE, AND A MOTOR VEHICLE

BACKGROUND

Technical Field

The present disclosure relates to an electric machine comprising a rotor having a rotor shaft and a brush module having a brush holder with at least one brush for energizing the rotor.

Description of the Related Art

Such an electric machine finds use in various fields, such as electrically operated motor vehicles. One common design is the externally excited synchronous machine, in which the rotor is electrically energized by slip rings on the rotor shaft and brushes. The brushes are pressed by springs against the slip contacts of the rotor in order to make possible an electrical contacting and to supply the rotor with current for generating a field.

One specific application for such electric machines is battery-operated four-wheel-drive vehicles. Here, boost axles are installed that are not involved continuously in the driving operation. Thus, the rotor of the electric machine of this boost axle only needs to be energized temporarily and for the rest of the time it is dragged along.

Since the brushes are pressed constantly by springs against the slip rings of the rotor shaft and the latter rotates permanently, also outside the boost process, frictional losses and wear of the brushes occur constantly at the contact sites of the slip rings. In order to make possible a good electrical contacting of the slip rings by the brushes, the brushes usually contain a material with large electrical conductivity (such as copper, silver or gold). These materials are particularly costly.

By a temporary spatial separation of the brushes from the slip rings it is possible to reduce the wear and thus the operating costs. Thus, the brushes will experience wear only during the boost process, when they are in electrical contact with the slip rings.

In order to make possible such a temporary and spatial separation of a brush from a slip ring of a rotor, it is known from the document EP 3 159 980 A1 how to use an inflatable balloon, besides a spring, which is secured by a bracket on a frame fixed in position in the radial direction of the rotor shaft. By filling or emptying the balloon element with a compressor, a brush can be pressed against its slip ring in the radial direction of the rotor shaft or lifted off from it. Thus, it is possible, by lifting off or pressing a brush in the radial direction of a rotor shaft, to make or break an electrical contact between the brush and a slip ring of the rotor shaft.

Furthermore, it is known from the document CN 111987868 A that a brush can be lifted off from its slip ring or pressed against it approximately radially to the axis of rotation of a rotor by the use of a turntable and a rotatable brush holder on which the brush is mounted. The brush holder can rotate about an axis which is situated parallel to the axis of rotation of the rotor and offset from it. Thanks to a likewise rotatable turntable, the brush is rotated by the brush holder away from the slip rings or pressed against them. It is possible to accomplish a rotation of multiple brushes with turntables by a cable which is moved by a motor and a spring. Thus, the electrical brush contact can be disconnected and one or more of the brushes can be moved in this way approximately radially to the axis of rotation of the rotor, the direction of movement being arc shaped.

BRIEF SUMMARY

Embodiments of the disclosure provide an improved way of decoupling brushes from a rotor of an electric machine.

Embodiments include an electric machine wherein a brush module comprises a shaft journal which can be coupled reversibly mechanically to a rotor shaft and the brush lies against this. The present disclosure proposes providing, in a brush module where one, or in some embodiments two or more brushes, are supported by a brush holder, also a shaft journal, which can be mechanically coupled to the rotor shaft of the electric machine or mechanically separated from it. In the coupled state, the shaft journal constitutes an axial extension of the rotor shaft. The brush or brushes can thus lie permanently against slip rings of the shaft journal without generating needless wear or friction, since the shaft journal only rotates when it is mechanically coupled to the rotor shaft of the electric machine. A brush holder serves for holding all brushes in position and for pressing them, for example by springs, against one or more slip rings on the shaft journal. In order to generate a directional current flow, at least two brushes and two separate slip rings are needed. The spatial separation of the brushes from a constantly rotating rotor shaft is produced no longer radially, but instead axially, by mechanical decoupling of the shaft journal. The shaft journal and the rotor shaft may be arranged coaxially to each other, in order to allow a simple mechanical coupling.

Besides the reversible mechanical coupling of the shaft journal to the rotor shaft, the electric machine described herein is also characterized in that a contact structure is provided on the shaft journal, which can be electrically contacted with a contact structure provided at the rotor shaft side or disconnected from it at the same time as the mechanical coupling or decoupling of the shaft journal and the rotor shaft. In this way, the rotor and the rotor shaft can be electrically energized through the shaft journal. An electrical current flow is produced in the contact structure of the shaft journal by a contact between current-carrying brushes and slip rings of the shaft journal. This current flow is continued into the contact structure of the rotor shaft by the mechanical coupling of the rotor shaft and the shaft journal and the rotor is energized. If the rotor shaft and the shaft journal are once more mechanically separated from each other, neither are the contact structures on the shaft journal and the rotor shaft in electrical contact any longer, so that the rotor is no longer energized by the shaft journal. The electrical coupling and decoupling occurs in synchronization with or at the same time as the mechanical coupling and decoupling, so that both connections are accomplished in the framework of a single common process.

In one embodiment, the shaft journal and/or the brush module can be displaced along the longitudinal axis of the rotor shaft for the mechanical coupling and decoupling. Because the mechanical coupling occurs by an axial displacement of the shaft journal and/or the brush module, an embodiment can be provided which is especially space-saving in the radial direction of the rotor shaft and the shaft journal. It is recommended that the rotor shaft and the shaft journal be situated coaxial to each other. Depending on the embodiment, as well as the size of the module and the available design space, either the shaft journal alone or the entire brush module, comprising the shaft journal, the brush holder and the brushes, can be displaced along the longitudinal axis of the rotor shaft for the reversible mechanical coupling. In some embodiments, this displacement may be brought about by an actuator, for example, in order for it to be controllable by a spatially distant control unit. The coupling and decoupling can thus be externally controlled. One suitable actuator can be, for example, a linear actuator, an electric motor, or a hydraulically or pneumatically controlled bolt. The actuator can work either in both directions or only in one direction, and in the latter case a reset device, such as a spring, is required.

One possibility of the mechanical coupling of the shaft journal to the rotor shaft without the use of additional coupling components is a spur gearing. In one embodiment of the electric machine, the shaft journal and the rotor shaft can be reversibly mechanically coupled to a spur gearing. By an axial displacement of the shaft journal and/or the brush module, the teeth of the spur gearings of both shaft ends can mesh with each other, thereby bringing about a reversible mechanical coupling. This coupling variant is space-saving in the radial direction of the coupling axis, since no add-on parts are needed and only the surfaces of the shaft ends are required for the coupling.

In one embodiment of the spur gear coupling, it can be provided that the shaft journal and the rotor shaft can be reversibly mechanically coupled to a shiftable coupling device. The shaft journal and the rotor shaft can be coupled or disconnected by axial displacement of the shaft journal and/or the brush module with the aid of an additional coupling device. Thanks to the use of such a coupling device, a complicated and usually costly further machining of the shaft ends is avoided, such as would be needed to create a spur gearing. The mounting of a coupling device might be less expensive than the fabrication of coupling structures on both shaft ends. A controllable actuator can also be used when using a coupling device for the axial displacement. In some embodiments, the coupling device may be shiftable and controllable from a spatial distance, for example by a control unit.

In the coupled state, the rotor shaft and the shaft journal are joined together in form fit by the coupling device or the spur gearing and they rotate in the same direction with identical number of revolutions. Thanks to the use of a coupling device in combination with an axial displacement of the shaft journal and/or the brush module, the rotor shaft and/or the shaft journal can also be given a small diameter. The use of a coupling device requires additional design space in the radial direction of the rotor shaft, but it allows any given configuration of the end faces of the rotor shaft and the shaft journal as well as the use of a rotor shaft and a shaft journal with small diameters.

As regards to the kind of coupling device for the reversible mechanical coupling of the shaft journal to the rotor shaft, in one embodiment it can be provided that the coupling device is a clutch, such as a claw clutch or a friction clutch. Clutches are usually standardized and thus economical components which can be used for the mechanical coupling of two shafts, where one or both shafts can rotate during the mechanical coupling. Many tried and true axial clutches can be used for this, while the design of the claw clutch seems suitable, since a good form fit is possible with this and consequently a good mechanical connection of both shaft ends with slight rotary play. Variants of claw clutches exist which have a scant design space requirement in the radial direction of the coupling axis. The use of a friction clutch for the mechanical coupling of two shaft ends by friction locking affords the advantage that they need not be synchronized, i.e., their angles of rotation do not need to be adapted to each other. Peak stresses and forces which might arise during the mechanical coupling are also much less in the case of a friction clutch.

Depending on the installation of an electric machine described herein, and the available design space, an axial displacement of the shaft journal and/or the brush module may or may not be possible. In one embodiment of an above-described electric machine, it can therefore be provided that the shaft journal and the brush module are fixed in position along the longitudinal axis of the rotor shaft, and the shaft journal and the rotor shaft may be reversibly mechanically coupled to a shiftable coupling device. By contrast with the previously discussed coupling variants, the mechanical coupling of the shaft journal and the rotor shaft must occur by an axial displacement of a coupling device, since in this configuration both shaft ends are fixed in position along the coupling axis. In this way, design space can be economized in the axial direction of the rotor shaft and the shaft journal, since neither the shaft journal nor the brush module is axially displaced, and the shaft ends being connected are as close together as possible. A suitable coupling device would also be shiftable in this case. The activating of the coupling device can be done, for example, through an actuator, which can be controlled by an external control unit. For this, a linear actuator, an electric motor, or a hydraulically or pneumatically controlled bolt can be provided, for example. The actuator can bring about the back and forth motion or only one of these motions, with a reset device such as a spring moving the coupling device back to the starting position.

In one embodiment, the coupling device is a sliding sleeve. With customary sliding sleeves having a suitable internal geometry, it is possible to achieve a form-fitting, reversible mechanical coupling of the rotor shaft and the shaft journal. Typically, the shaft ends each have exterior splines, while the sliding sleeve has an interior spline engaging with the splines on the shaft side.

Besides the variants of mechanical coupling, one embodiment of an electric machine described herein is characterized in regard to the electrical contacting of the rotor shaft in that the contact structures on the shaft journal and the rotor shaft comprise at least two preferably annular contact elements for the electrical contacting or disconnecting, being provided on the shaft journal and the rotor shaft at the end side, or a contact structure is provided on the coupling device, which electrically contacts or disconnects the contact structures on the shaft journal and the rotor shaft at the same time as the mechanical coupling or decoupling. In order to assure a desired direction of turning of the rotor shaft and rotor, a correct poling is necessary for the electrical contacting. It is therefore recommended to use contact elements or contact structures allowing a definable electrical contacting regardless of the angle of rotation. Suitable for this are annular contact elements which are provided at the end faces of the rotor shaft and the shaft journal. For example, two annular contact elements are provided for each end face, in order to make possible a directional current flow. These end-face contact elements can also protrude from the end faces, so that a secure electrical contacting is even possible when the end faces of the rotor shaft and the shaft journal are not exactly flush against each other. This can be accomplished already by a protrusion of the contact elements of only a few tenths of a millimeter. For example, with end-face contact elements in the form of an inner ring with small radius and an outer ring with large radius, it can always be assured during pure axial displacement of one shaft end and by the radial offset that the inner ring of the one shaft end can only contact electrically the inner ring of the other shaft end. The same holds for the two outer rings. Hence, at no time can any contact occur between an inner ring and an outer ring, thereby preventing a faulty electrical poling.

End-face contact elements may also be realized by an exterior and an interior annular groove, where the annular grooves of the rotor shaft and the shaft journal mesh together upon mechanical coupling, thereby producing an electrical contact. The kind of contacting is similar to the already described electrical contacting by end-face annular contact elements. When using annular grooves, annular rabbets are provided on one of the two shaft ends, projecting from the end face and sliding into annular grooves of the second shaft end upon mechanical coupling of the shaft ends. The cross section of the annular grooves, or rabbets, may be trapezoidal, in order to make possible an easy mechanical coupling. The electric contact elements can be provided either at the groove bottoms and the end faces of the rabbets or on the groove side surfaces and the side surfaces of the rabbets. Thanks to the spatial offset of the contact elements in the radial direction and the separation by grooves and rabbets, a wrong electrical poling is also prevented with this kind of electrical contacting, while at the same time an additional fixation of the mechanical coupling in the radial direction is accomplished by a form fit between grooves and rabbets. Besides the use of two or more contact elements per shaft end, it is also possible to provide only one contact element per shaft end for the electrical energization of the rotor, in which case the current flow is then possible only by providing an additional contact on the rotor or the rotor shaft.

If the rotor shaft and the shaft journal are fixed in position relative to each other along the longitudinal axis of the rotor shaft, as described above, so that their end faces do not touch in the coupled state, the electrical contacting through the mechanical coupling device is possible. Accordingly, the contact structure on the rotor shaft will be brought into electrical contact by a suitable contact structure of the coupling device with the contact structure on the shaft journal at the same time as the mechanical coupling. Once again, a correct electrical poling is important. For this, annular end-face contact elements may be provided once again at the shaft ends or the contact elements are configured as encircling rings on the exterior cylindrical envelope surfaces of the shaft ends.

In regard to the economical operation of an electric machine, a savings on weight and a reduction of rotating masses may occur. In one embodiment of the electric machine described herein, it may be provided that the shaft journal and/or the rotor shaft is a hollow shaft. With this design, both the performance and the efficiency of the electric machine can be improved.

Besides the above-described electric machine, some embodiments include a brush module for an electric machine comprising a brush holder having at least one brush. The brush module is characterized in that it comprises a shaft journal which can be coupled reversibly mechanically to a rotor shaft and against which the brush lies. All the embodiments of the electric machine can be applied analogously to the brush module described herein, so that the corresponding benefits will also result for the brush module.

As described above for an electric machine, the shaft journal of the brush module may be displaced along its longitudinal axis for the mechanical coupling and decoupling. The axial coupling, which can also be controlled, for example, by an actuator and a remote control device, allows the use of the brush module in narrow design space in the radial direction of the shaft journal. Here as well, the mechanical coupling and the design space requirement for the brush module are favored by a coaxial arrangement of the rotor shaft and the shaft journal.

A brush module described herein may be characterized in that the shaft journal comprises a spur gearing, by which it can be coupled reversibly mechanically to the rotor shaft. In this way, a coupling of the rotor shaft and the shaft journal is possible with the least possible design space requirement radially to the coupling axis.

Analogously to the electric machine described herein, the brush module may be provided a shiftable coupling device on the shaft journal, by which the shaft journal can be coupled reversibly mechanically to the rotor shaft. In this way, a further machining of the rotor shaft and the shaft journal, such as would be needed in the case of a spur gearing, for example, can be avoided.

In some embodiments, the coupling device may be a clutch, such as a claw clutch or a friction clutch. As explained for the electric machine, the use of tried and true clutches is recommended for realizing a reversible mechanical coupling of the rotor shaft and the shaft journal. These make possible a form-fitted coupling of the shaft journal with the rotor shaft, where mechanical connections with little rotary play are possible. Alternatively, a friction clutch may also be provided for mechanical coupling of the shaft ends by a frictional locking. Thus, a synchronization of the shaft ends for the coupling is no longer required. Undesirable coupling forces which arise during the coupling process can be reduced. Design space in the radial direction of the rotor shaft and the shaft journal can be economized, depending on the type of coupling.

For example, one embodiment of a brush module described herein has the shaft journal fixed in position along its longitudinal axis, and a shiftable coupling device is provided, by which the shaft journal can be coupled reversibly mechanically to the rotor shaft. This design variant allows the use of a brush module described herein even when sufficient design space is not available to make possible the displacement along the longitudinal axis of the shaft journal.

Against this background, another embodiment of a brush module is characterized in that the coupling device is a sliding sleeve. The coupling device, or the sliding sleeve, is shiftable and may be shifted by an actuator, for example, by using an external switch unit.

As described above for an electric machine, a brush module described herein may also be characterized in that a contact structure is provided on the shaft journal, which can be electrically contacted with or disconnected from a contact structure provided at the rotor shaft side at the same time as the mechanical coupling or decoupling of the shaft journal and the rotor shaft. In this way, the rotor shaft can be energized by a mechanical contact with the shaft journal of the brush module through an electrical contacting of the contact structures of the shaft journal and the rotor shaft which is formed or disconnected at the same time as the mechanical coupling. The electrical contacting is made possible only by the mechanical coupling or disconnecting.

In regard to the electrical contacting of the rotor shaft by the shaft journal, the contact structure on the shaft journal may comprise at least two annular contact elements for the electrical contacting or disconnecting, being provided on the shaft journal at the end side, or a contact structure is provided on the coupling device, which electrically contacts or disconnects at the same time as the mechanical coupling or decoupling. The contact structure of the shaft journal of a brush module described herein may thus be brought into electrical contact with the contact structure of the rotor shaft by contact elements at its end face and the end face of the rotor shaft. It is recommended to provide annular contact elements for this, such as an inner ring and an outer ring, which allow a contacting regardless of angle of rotation and always with correct electrical poling. The contact structures of the rotor shaft and the shaft journal may also be joined together in electrically conducting manner by a coupling device having a contact structure and contact elements, for example, with a sliding sleeve. In connection with a coupling device, it is also possible to provide the contact elements on the envelope surfaces of the shaft journal and/or the rotor shaft. By axial displacement of the coupling structure, such contact elements can make electrical contact with contact elements of the coupling structure or be separated from each other.

Also, one embodiment for a brush module described herein is characterized in that the shaft journal is a hollow shaft. In this way, material and weight can be economized.

In some embodiments, an electric machine and/or a brush module described herein may be used in an electric drive train of a motor vehicle.

Some embodiments include a motor vehicle comprising at least one electric machine.

BRIEF DESCRIPTION OF THE SEVERAL VIEWS OF THE DRAWINGS

Further benefits and details will emerge from the following described embodiments and with the aid of the drawings.

DETAILED DESCRIPTION

Figure 1:
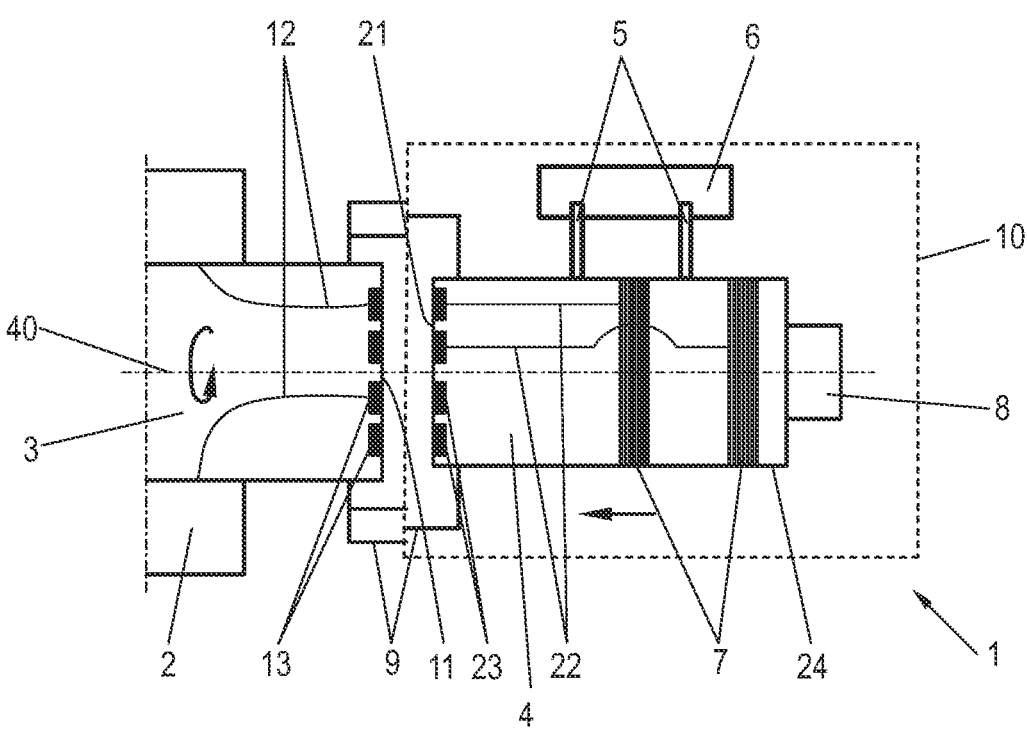
FIG. 1 shows an electric machine with an axially displaceable shaft journal, a rotor shaft axially fixed in position, and a coupling device in the decoupled state.

FIG. 1 shows an embodiment of an electric machine 1 having a rotor 2 with a rotor shaft 3 and a brush module 10, not coupled to the rotor shaft 3. The brush module 10 depicted comprises a shaft journal 4 as well as two brushes 5 and a brush holder 6, which supports the brushes 5 and presses against the envelope surface 24 of the shaft journal 4. The rotor shaft 3 and the shaft journal 4, fixed in position in the axial direction, are positioned coaxial to each other along the coupling axis 40 and can be reversibly mechanically coupled together with the coupling device 9 by a displacement to the left of the shaft journal 4 along the coupling axis 40. An axial displacement of the shaft journal 4 can be accomplished with the aid of an actuator 8, the displacement in both directions being possible by a two-way actuator or a one-way actuator having a reset device.

For the electrical energization of the rotor 2, an electrically conductive contact structure 12 is provided at the rotor shaft side, which can be energized by contact elements 13 at the end face 11. Likewise, the shaft journal 4 also has an electrically conductive contact structure 22 which in turn can be energized by the brushes 5 across the two slip rings 7 when these are in electrical contact with the brushes 5.

Because of the axial offset of the shaft journal 4 along the coupling axis 40, its slip rings 7 are not in electrical contact with the brushes 5, so that the contact structure 22 and the contact elements 23 arranged on the end face 21 of the shaft journal 4 are not energized.

If not just the shaft journal 4 but also the entire brush module 10 and thus also the brush holder 6 and brushes 5 were displaced by the actuator 8, they would be in continuous electrical contact with the slip rings 7 and the contact structure 22 with the contact elements 23 would be energized. Even if the contact structure 22 were to carry an electric current, the contact structure 12 of the rotor shaft 3 in the figure would not be energized, since the rotor shaft-side contact elements 13 are not in electrical contact with the contact elements 23 of the shaft journal 4 thanks to the axial spacing. The current flow from the brushes 5 to the rotor 2 and back is interrupted.

Figure 2:
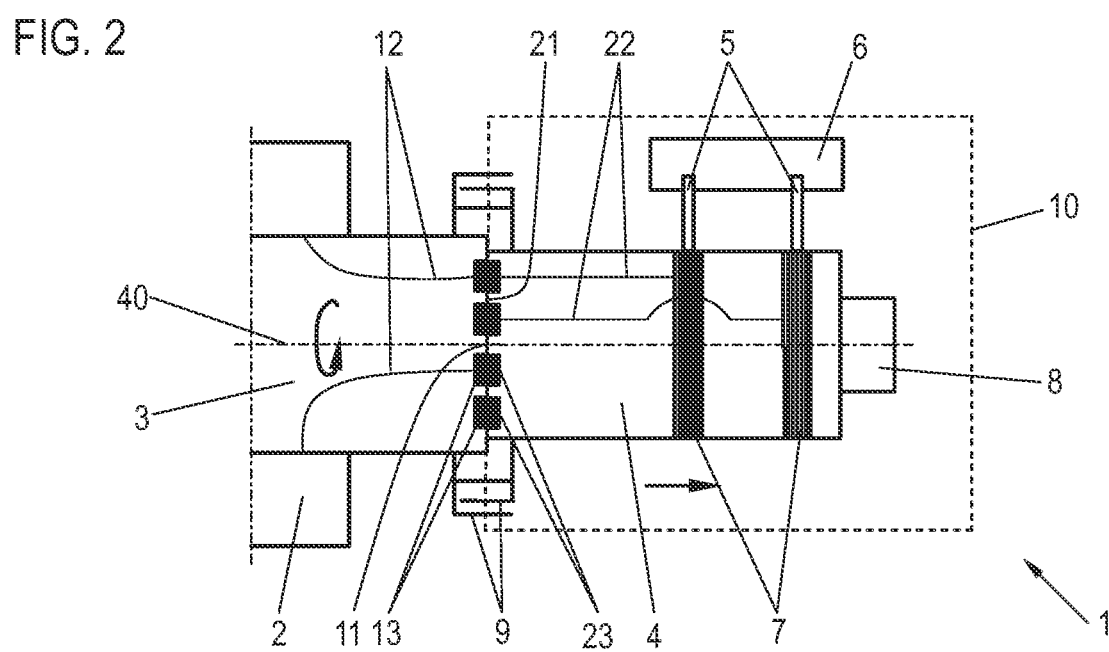
FIG. 2 shows an electric machine with an axially displaceable shaft journal, a rotor shaft axially fixed in position, and a coupling device in the coupled state.

FIG. 2 shows the machine 1 of FIG. 1, but now the shaft journal 4 is mechanically coupled to the rotor shaft 3 by displacement along the coupling axis 40. The mechanical coupling is accomplished with the aid of the coupling device 9. The required displacement of the shaft journal 4 is brought about by the actuator 8. In the coupled state, the end faces 11 and 21 lie against each other, so that the contact elements 13 of the rotor shaft 3 form an electrically conductive connection with the contact elements 23 of the shaft journal 4. In this way, an energization of the rotor 2 is possible at the same time as the mechanical coupling of the two shaft ends, the electric current being conducted from the brushes 5 through the friction contact produced in this position to the slip rings 7 and energizing the connected contact structure 22 with the contact elements 23. The current is taken further via the contact structure 12 to the rotor 2 by the electrical connection to the contact elements 13 of the rotor shaft 3. The electric current can furthermore flow back in the opposite direction from the rotor 2 to the brushes 5.

An axial displacement to the right of the shaft journal 4 or the entire brush module 10 would once again mechanically decouple the shaft journal 4 from the rotor shaft 3 and consequently also interrupt the electric current flow across the end-face contact elements 13 and 23.

Figures 3, 4:
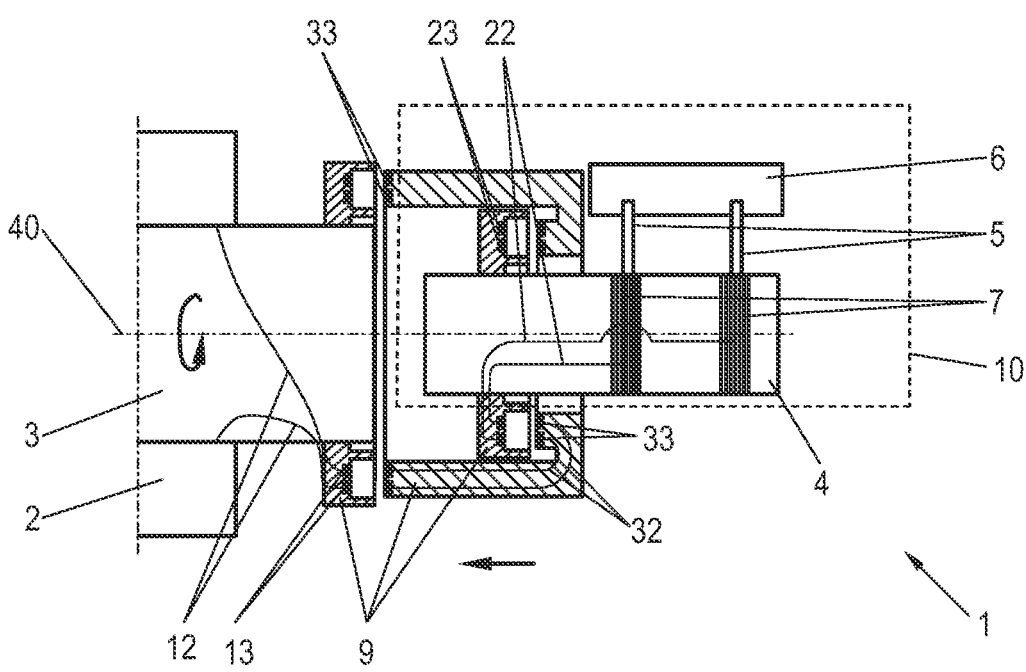
FIG. 3 shows an electric machine with a shaft journal axially fixed in position and a rotor shaft axially fixed in position, and an axially displaceable coupling device in the decoupled state.
FIG. 4 shows an electric machine with a shaft journal axially fixed in position and a rotor shaft axially fixed in position, and an axially displaceable coupling device in the coupled state.

An embodiment of the electric machine 1 in FIG. 3 differs from the previous examples in that the entire brush module 10, encompassing the shaft journal 4 as well as the brush holder 6 with brushes 5, is fixed in position along the coupling axis 40. Since the rotor 2 with the rotor shaft 3 is also fixed in position along this axis, the mechanical coupling and the electrical contacting can only occur through a coupling device 9. This is axially movable along the coupling axis 40 in the figure, the displacement being possible in both directions and occurring with a two-way actuator or a one-way actuator having a reset device. The rotor shaft 3 and the shaft journal 4 are coaxial. The figure shows an opened coupling device 9, by which the shaft journal 4 and the rotor shaft 3 are neither mechanically coupled nor electrically contacted. Because the shaft journal 4 is axially fixed in position, the brushes 5 are constantly pressed by the brush holder 6 against the slip rings 7 and the contact structure 22 with the contact elements 23 of the shaft journal 4 is continuously energized. In the depicted open position of the coupling device 9, the contact elements 23 do not form an electrically conductive connection with the contact elements 33 of the coupling device 9. Thus, the contact structure 32, which is needed to generate an electric current flow from the shaft journal 4 to the rotor 2, carries no current and the contact structure 12 at the rotor shaft side as well as its contact elements 13 also remain non-energized.

The electric machine 1 of FIG. 3 is shown in the coupled state in FIG. 4. The coupling device 9 which is movable along the coupling axis 40 has been displaced to the left and is in the closed state. The rotor shaft 3 and the shaft journal 4 are mechanically coupled together across the coupling device 9. At the same time, an electrical energization of the rotor 2 is also possible. For this, the current flows across the brushes 5 of the brush holder 6 to the slip rings 7, by which the contact structure 22 of the shaft journal 4 is energized. The electric current is conducted further by electrical contact of the contact elements 23 with the contact elements 33 of the coupling device 9 to their contact structure 32 and from here it is taken again through contact elements 33 to the contact elements 13 of the rotor shaft 3. In this way, the contact structure 12 of the rotor shaft 3 and finally the rotor 2 as well are energized, while a current flow in the opposite direction from the rotor 2 to the brushes 5 is also possible.

Figure 5:
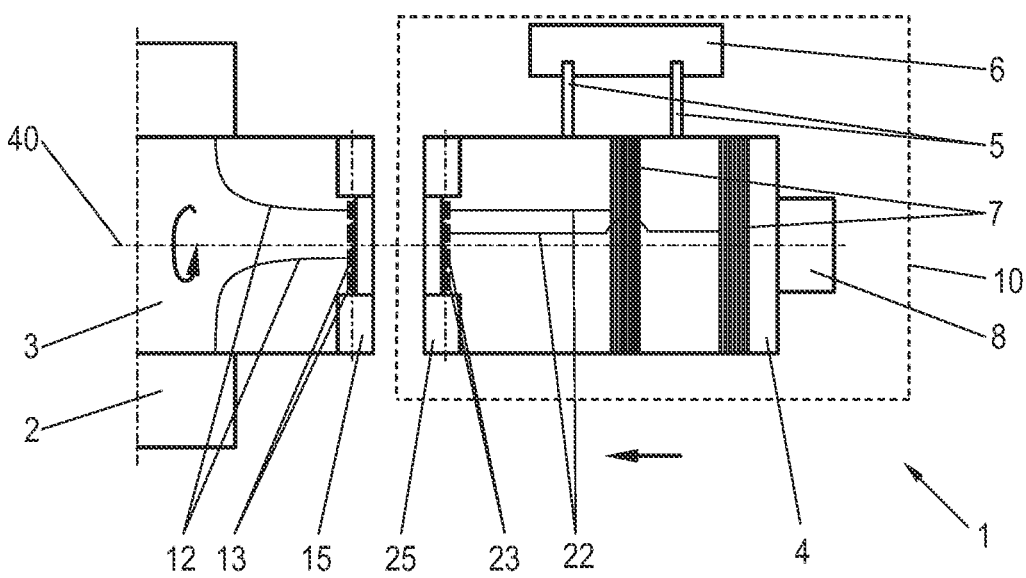
FIG. 5 shows an electric machine with a shaft journal axially fixed in position and a rotor shaft axially fixed in position, having a spur gearing, in the decoupled state.
Figure 6:
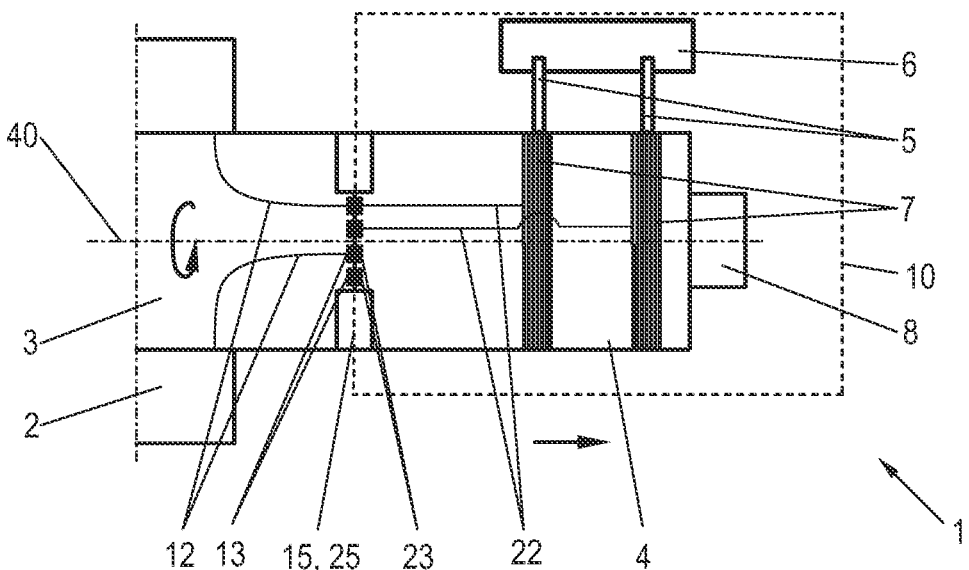
FIG. 6 shows an electric machine with a shaft journal axially fixed in position and a rotor shaft axially fixed in position, having a spur gearing, in the coupled state.

An alternative embodiment of an electric machine 1 with a spur gearing for the reversible mechanical coupling of the shaft journal 4 to the rotor shaft 3 is represented in FIG. 5 and FIG. 6. FIG. 5 shows the decoupled state. The spur gearings 15 and 25 are provided on the rotor shaft 3 of the rotor 2 and on the shaft journal 4. The shaft journal 4 can be moved along the coupling axis 40 by an actuator 8 and is positioned coaxial to the rotor shaft 3. In the depicted state, the spur gearings 15 and 25 do not mesh with each other, on account of the axial offset, so that no mechanical coupling exists between the rotor shaft 3 and the shaft journal 4 and consequently neither is any electrical current flow possible between the brushes 5 of the brush holder 6 and the rotor 2. The electrically conductive contact structure 22 of the shaft journal 4 is not energized by the brushes 5, since these do not lie against the slip rings 7. Moreover, due to the axial offset, neither is any electrical contact possible between the contact elements 23 and 13 of the shaft journal 4 and the rotor shaft 3. If the contact structure 22 were constantly energized, for example, because the entire brush module 10 and thus also the brushes 5 were axially displaced by the actuator 8, there would still be no energization of the rotor 2 possible in the depicted state because of the spatial separation of the contact elements 13 and 23. The contact structure 12 of the rotor shaft 3 is currentless.

The coupled state of the electric machine 1 of FIG. 5 is illustrated in FIG. 6. Here, the shaft journal 4 has been moved by the actuator 8 to the left along the coupling axis 40, so that the spur gearings 15 and 25 of the rotor shaft 3 and the shaft journal 4 mesh together and a form-fitting mechanical coupling exists. The shaft journal 4 rotates along with the continuously rotating rotor shaft 3. At the same time as the mechanical coupling, the rotor 2 is energized by the brushes 5 of the brush holder 6. At first, the contact structure 22 of the shaft journal 4 is energized by the brushes 5 across the slip rings 7. An electrically conducting connection of the contact structures 12 and 22 also occurs across the annular contact elements 13 and 23 provided at the end face due to the mechanical contact of the rotor shaft 3 and the shaft journal 4.

Figure 7:
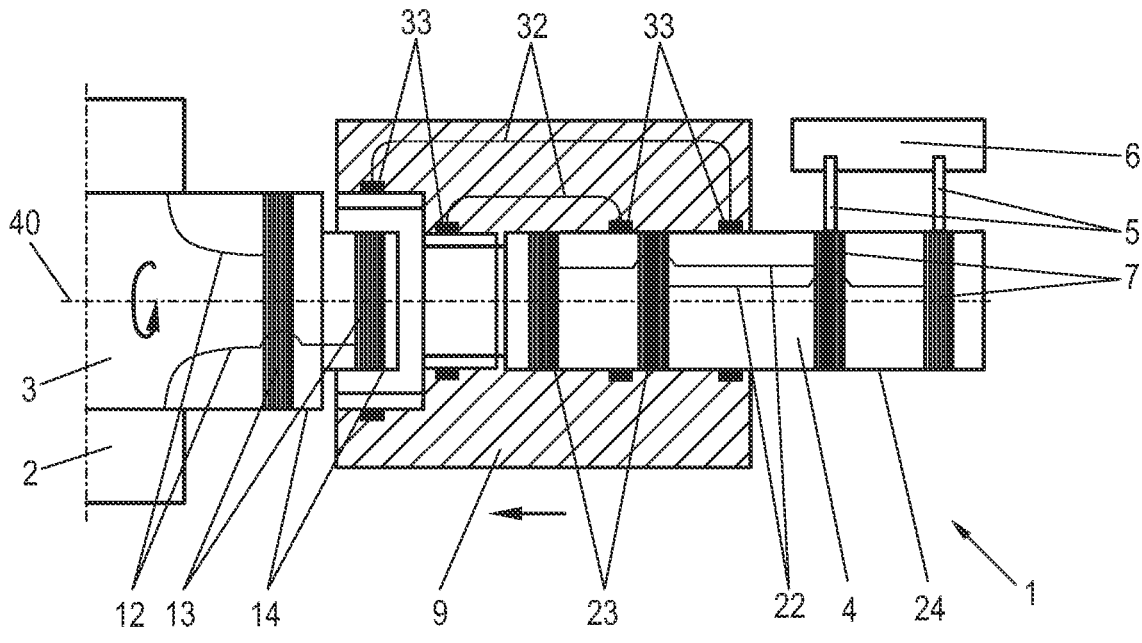
FIG. 7 shows an electric machine with a shaft journal axially fixed in position and a rotor shaft axially fixed in position, having a sliding sleeve, in the decoupled state.
Figure 8:
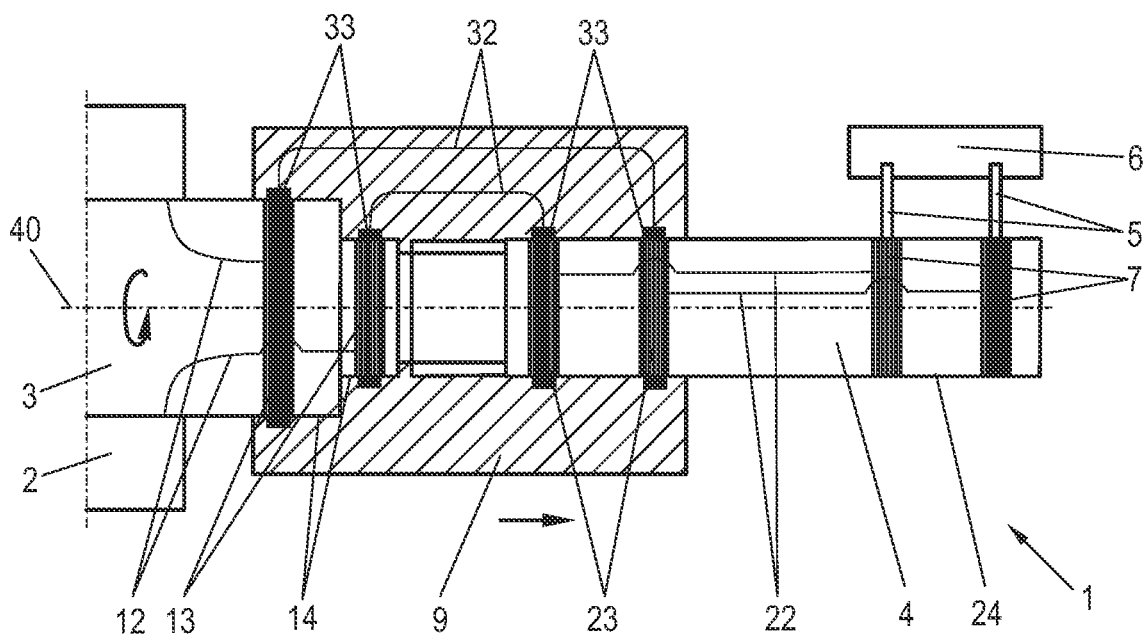
FIG. 8 shows an electric machine with a shaft journal axially fixed in position and a rotor shaft axially fixed in position, having a spur gearing, in the coupled state.

FIG. 7 and FIG. 8 show a further embodiment of an electric machine 1, in which the mechanical coupling and the electrical contacting of the rotor shaft 3 and the shaft journal 4 occur by a coupling device 9 in the form of a sliding sleeve. The rotor shaft 3 as well as the shaft journal 4 are fixed in position along the coupling axis 40, while the coupling device 9 can move along this axis in both directions, for example, by an actuator or an actuator in combination with a reset device. The contact structure 22 of the shaft journal 4 is constantly energized across the slip rings 7 from the brushes 5 of the brush holder 6.

In the decoupled state, which is shown in FIG. 7, the shaft journal 4 and the rotor shaft 3 are mechanically decoupled on account of the coupling device 9 having been moved to the right along the coupling axis 40 and thus opened. At the same time, the contact structures 12 and 22 of the rotor shaft 3 and the shaft journal 4 do not stand in an electrically conducting connection, since their contact elements 13 and 23 are not electrically bridged by the contact structure 32 and the contact elements 33 due to the axial offset of the coupling device 9 in the decoupled state. The rotor 2 is therefore not energized by the brushes 5.

In the mechanically coupled state of the same electrical machine in FIG. 8, the coupling device 9, or the sliding sleeve, has on the contrary been moved to the left in the direction of the coupling axis 40. Both shaft ends are reversibly mechanically coupled to each other by an interior spline of the coupling device 9 and an exterior spline on the shaft ends of the rotor shaft 3 and the shaft journal 4. At the same time, the contact elements 33 of the coupling device 9 also lie against the contact elements 13 and 23. These are provided here as annular contact elements on the envelope surfaces 14 and 24 of the shaft ends. Depending on the form of the coupling device 9, the contact elements 13 and 23 as well as the contact elements 33 of the coupling device 9 can also be provided at the end face or on a shaft shoulder in the radial direction. In the depicted state, the contact structures 12 and 22 are electrically bridged by the contact structure 32 of the coupling device 9. In this way, a current flow from the brushes 5 to the rotor 2 and vice versa is possible.

Figure 9:
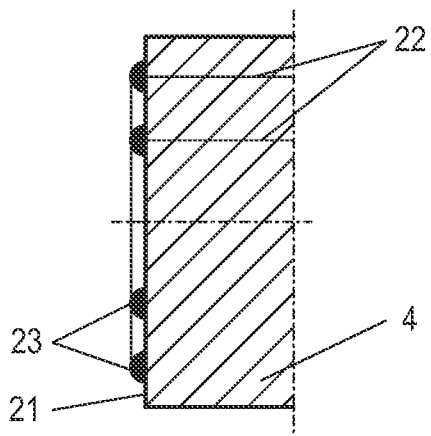
FIG. 9 shows shaft end with contact elements protruding from the end face.

In FIG. 9 a shaft journal 4 with the end face 21 is shown in the form of an alternative embodiment, with two annular contact elements 23 provided on the end face. The contact elements 23 protrude somewhat perpendicular to the end face 21, the protrusion amounting to a few tenths of a millimeter, for example. If such contact elements are provided on two shaft ends, a mutual electrical contacting of these shaft ends can be assured even when their end faces are not exactly planar and/or not flush against each other.

Figure 10:
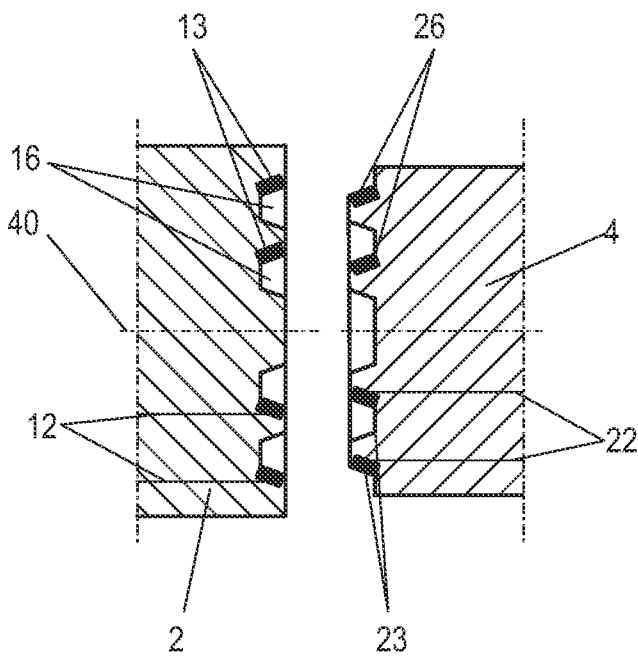
FIG. 10 shows contact elements at the end faces of two shaft ends having annular grooves and rabbets.

As a further embodiment of an electrical contacting of two shaft ends, the contact structure 12 of a rotor shaft 3 and the contact structure 22 of a shaft journal 4 are represented in the decoupled state in FIG. 10. The shaft journal 4 is positioned coaxially to the rotor shaft 3 and can be moved along the coupling axis 40, the rotor shaft-side contact elements 13 and the journal-side contact elements 23 not forming any electrically conducting connection. If the shaft journal 4 is moved to the left against the rotor shaft 3, for example by an actuator, the contact elements 13 and 23 of the contact structures 12 and 22 will make contact. Thanks to the annular shape of the contact elements 13 and 23, an electrical contacting of both contact structures 12 and 22 regardless of the angle of rotation is possible, while the radial offset of the contact elements 13 and 23 and their arrangement on annular grooves 16 and rabbets 26 will prevent a wrong electrical contacting in the event of a purely axial displacement. If the rotor shaft 3 and the shaft journal 4 are brought together in end-face contact, the rabbets 26 on the shaft journal 4 will slide into the annular grooves 16 of the rotor shaft 3, so that the contact elements 13 and 23 will make electrical contact.

German patent application no. 10 2022 117413.1, filed Jul. 13, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric machine, comprising:
a rotor having a rotor shaft; and
a brush module having a brush holder with at least one brush for energizing the rotor,
wherein the brush module comprises a shaft journal which is coupled reversibly mechanically to the rotor shaft to enable the shaft journal to be selectively uncoupled from the rotor shaft during operation of the electric machine, and wherein the brush lies against the shaft journal.

2. The electric machine according to claim 1, wherein the shaft journal and/or the brush module can be displaced along a longitudinal axis of the rotor shaft for the mechanical coupling and decoupling.

3. The electric machine according to claim 2, wherein the shaft journal and the rotor shaft are reversibly mechanically coupled to a spur gearing.

4. The electric machine according to claim 2, wherein the shaft journal and the rotor shaft are reversibly mechanically coupled to a shiftable coupling device.

5. The electric machine according to claim 4, wherein the shiftable coupling device is a clutch.

6. The electric machine according to claim 5, wherein the clutch is a claw clutch.

7. The electric machine according to claim 5, wherein the clutch is a friction clutch.

8. The electric machine according to claim 1, wherein the shaft journal and the brush module are fixed in position along a longitudinal axis of the rotor shaft, and the shaft journal and the rotor shaft are reversibly mechanically coupled to a shiftable coupling device.

9. The electric machine according to claim 8, wherein the shiftable coupling device is a sliding sleeve.

10. The electric machine according to claim 1, wherein a contact structure is provided on the shaft journal, which is electrically contacted with a contact structure provided at the rotor shaft or disconnected from the contact structure at the same time as the mechanical coupling or decoupling of the shaft journal and the rotor shaft.

11. The electric machine according to claim 10, wherein the contact structures on the shaft journal and the rotor shaft comprise at least two contact elements for the electrical contacting or disconnecting, being provided on the shaft journal and the rotor shaft at an end side, or a contact structure is provided on the coupling device, which electrically contacts or disconnects the contact structures on the shaft journal and the rotor shaft at the same time as the mechanical coupling or decoupling.

12. The electric machine according to claim 1, wherein the shaft journal and/or the rotor shaft is a hollow shaft.

13. A motor vehicle comprising at least one electric machine according to claim 1.

14. A brush module for an electric machine, comprising:
a brush holder having at least one brush, wherein the brush module comprises a shaft journal which can be coupled reversibly mechanically to a rotor shaft to enable the shaft journal to be selectively uncoupled from the rotor shaft during operation of the electric machine, and wherein the brush lies against the shaft journal.

15. The brush module according to claim 14, wherein the shaft journal can be displaced along a longitudinal axis thereof for the mechanical coupling and decoupling.

16. The brush module according to claim 15, wherein the shaft journal comprises a spur gearing, by which the shaft journal can be coupled reversibly mechanically to the rotor shaft.

17. The brush module according to claim 15, wherein a shiftable coupling device is provided on the shaft journal, by which the shaft journal can be coupled reversibly mechanically to the rotor shaft.

18. The brush module according to claim 17, wherein the shiftable coupling device is a clutch.

19. The brush module according to claim 18, wherein the clutch is a claw clutch.

20. The brush module according to claim 18, wherein the clutch is a friction clutch.

21. The brush module according to claim 14, wherein the shaft journal is fixed in position along a longitudinal axis thereof, and a shiftable coupling device is provided, by which the shaft journal can be coupled reversibly mechanically to the rotor shaft.

22. The brush module according to claim 21, wherein the shiftable coupling device is a sliding sleeve.

23. The brush module according to claim 14, wherein a contact structure is provided on the shaft journal, which can be electrically contacted with a contact structure provided at the rotor shaft or disconnected from the contact structure at the same time as the mechanical coupling or decoupling of the shaft journal and the rotor shaft.

24. The brush module according to claim 23, wherein the contact structure on the shaft journal comprises at least two contact elements for the electrical contacting or disconnecting, being provided on the shaft journal at an end side, or a contact structure is provided on a coupling device, which electrically contacts or disconnects at the same time as the mechanical coupling or decoupling.

25. The brush module according to claim 14, wherein the shaft journal is a hollow shaft.

* * * * *